Figures 1, 2:
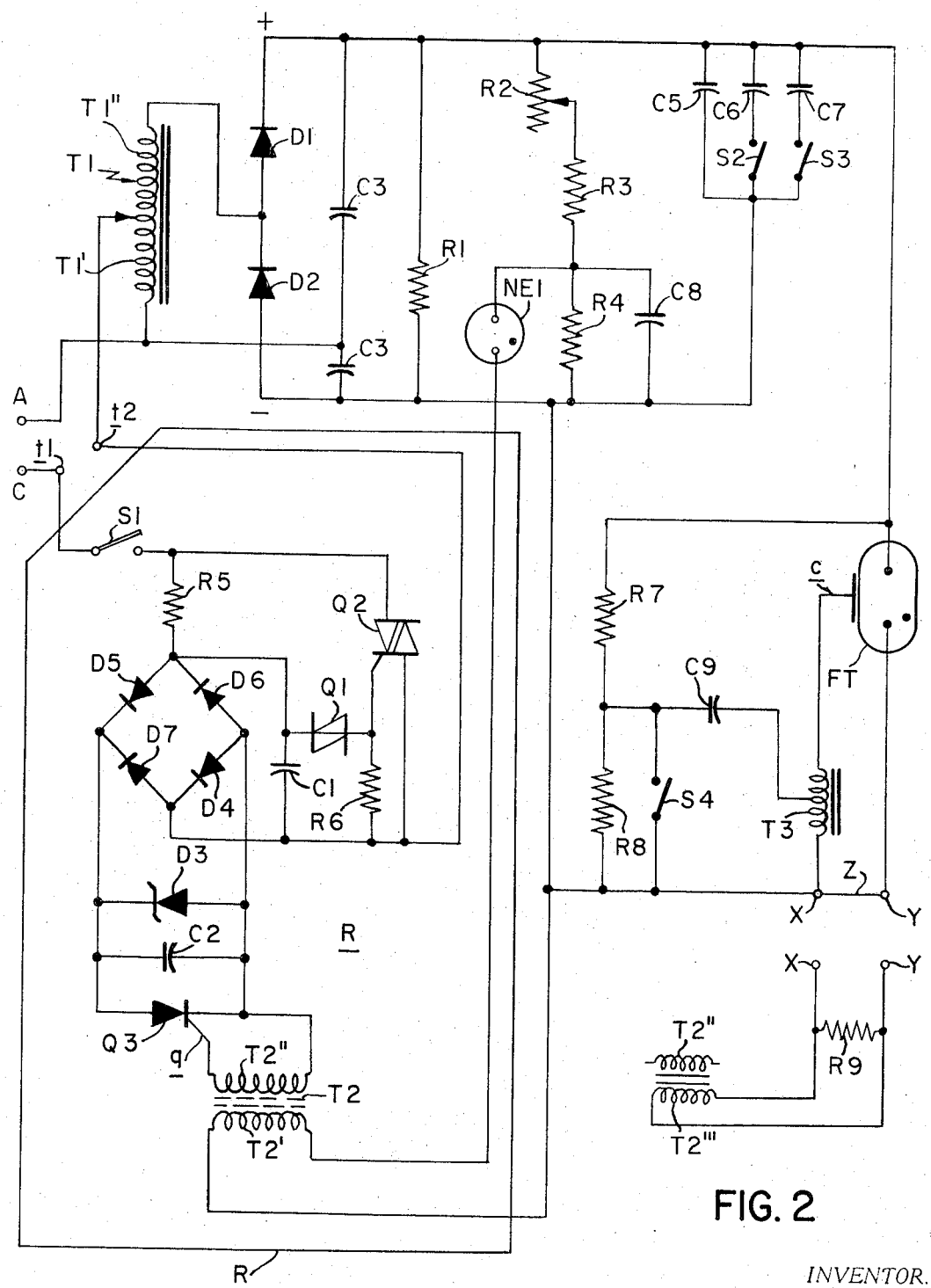

United States Patent [19]
Paget

[11] 3,780,344
[45] Dec. 18, 1973

[54] CHARGE REGULATING CIRCUIT FOR FLASH LAMP STORAGE CAPACITOR

[75] Inventor: Fredrick W. Paget, Hamilton, Mass.

[73] Assignee: GTE Sylvania Incorporated, Danvers, Mass.

[22] Filed: Sept. 7, 1971

[21] Appl. No.: 178,066

[52] U.S. Cl. ............ 315/241 P, 315/241 R, 320/1
[51] Int. Cl. .......................................... H05b 37/00
[58] Field of Search .............. 315/241 R, 241 P, 315/100 S; 320/1

[56] References Cited
UNITED STATES PATENTS

| | | | |
|---|---|---|---|
| 3,007,081 | 10/1961 | Sebastian | 315/241 P |
| 3,213,344 | 10/1965 | Jensen | 315/241 R X |
| 3,229,158 | 1/1966 | Jensen | 315/100 S |
| 3,586,906 | 6/1971 | Okuno et al | 315/241 P |
| 3,651,373 | 3/1972 | Ratsch | 315/241 |

*Primary Examiner*—H. K. Saalbach
*Assistant Examiner*—Lawrence J. Dahl
*Attorney*—Norman J. O'Malley et al.

[57] ABSTRACT

A flash lamp for photographic exposures discharges from one or more high voltage storage capacitors charged from an alternating current source under the control of a charge regulating circuit. The regulating circuit comprises a bridge rectifier charging a regulator capacitor to the threshold voltage of an SBS-triac combination connecting the AC source to a step up transformer whose rectified output charges the flash lamp storage capacitors. A neon lamp sensing the voltage on the storage capacitors is transformer coupled to an SCR which shunts the regulating capacitor preventing the regulating capacitor from applying threshold voltage to the SBS and triac and stopping charge of the storage capacitors.

13 Claims, 2 Drawing Figures

PATENTED DEC 18 1973

3,780,344

*INVENTOR.*
FREDRICK W. PAGET

BY *James H. Grover*

ATTORNEY

CHARGE REGULATING CIRCUIT FOR FLASH LAMP STORAGE CAPACITOR

RELATED APPLICATION

Reference is made to my copending application Ser. No. 122,793, filed Mar. 10, 1971 now U.S. Pat. No. 3,644,818, entitled Electronic Flash Lamp Power Supply.

BACKGROUND OF THE INVENTION

Gas discharge flash lamps of various types, for example, photographic lamps flashed at a selected exposure intensity, require rather precise and reliable control of the charge on the capacitor which supplies the high voltage for the lamp's gas discharge. Voltage regulation of the power supply for the storage capacitor is a satisfactory but an expensive and cumbersome method of controlling charging voltage because it requires high voltage components. Differential amplifiers which sense the charging voltage require a separate voltage supply and reference voltage source and in general operate from an additional direct current power supply and may involve a mechanical relay for switching the high voltage supply.

Accordingly, the object of the present invention is to provide a regulator circuit with a minimum of low voltage components, which will operate in a closed loop between the storage capacitor and an alternating current supply to give precise regulation of the charge on the storage capacitors.

SUMMARY OF THE INVENTION

According to the invention a regulating circuit for maintaining a predetermined charge on a storage capacitor comprises controlled switch means having control terminals for connection to the power source and responsive to a threshold voltage to start and charge the storage capacitor from the power source, a voltage supply, regulating means for applying the threshold voltage from the supply to the switch means, a controlled electron valve connected to and operative to control the regulating means, and means responsive to charge of the storage capacitor to said predetermined voltage to operate the valve and stop the regulating means from applying the threshold voltage to the switch means, whereby said switch means, valve and charge responsive means complete a loop regulating repeated starting and stopping of power supply to the storage capacitor, thereby to hold the charge on the storage capacitor at substantially constant voltage.

DRAWING

For the purpose of illustration typical embodiments of the invention are shown in the accompanying drawing in which:

FIG. 1 is a schematic drawing of a circuit for charging flash lamp storage capacitors and a regulating circuit therefor; and FIG. 2 schematically shows a modification of FIG. 1.

DESCRIPTION

In FIG. 1 of the drawing is shown a flash lamp or tube FT such as Sylvania type R4326 and suitable for use in exposing microfilm. The flash lamp emission intensity is dependent upon the voltage and amount of charge in one or more of three high voltage, high current storage capacitors C5, C6 and C7 rated for example, at 400 microfarads, 500 volts. Storage capacity is selected by closing none, one or both of two manual switches S2 and S3 to use only or add to the capacity of capacitor C5. When an exposure switch S4 is closed a fraction of the charge voltage divided by resistors R7 (2 megohms) and R8 (1 megohm) and stored in an 0.22 microfared capacitor C9 is discharged through a 1:20 step up autotransformer T3. The resulting high voltage pulse applied to the trigger wire c of the flash tube ignites the tube and initiates its light emissive discharge.

As mentioned above, lamp intensity depends not only on storage capacity but also on the voltage of the charge. The storage capacitors are charged from an autotransformer T1 whose primary T1' is connected from one 60 Hz, 120 VAC line terminal A through a triac Q2 (SC46B) and an On-Off switch S1 to the other AC terminal C. The triac switching means Q2 has terminals $t1$ and $t2$ connected to the line terminals A and C which, through the AC transformer T1, comprise the alternating current charging power source. The 230 VAC in the secondary T1" is doubled and rectified by diodes D1 and D2 (1N5062) and filtered by 4 microfared capacitors C3. A 500 kilohm potentiometer R2 and series resistors R3 (820 kilohms) and R4 (390 kilohms) divide the high voltage and charge an 0.05 micorfared capacitor C8. The voltage on the storage capacitors C5, C6, C7 desired for discharge through the lamp FT is selected by adjusting the potentiometer with reference to the breakdown voltage of a neon glow discharge device NE1 (Signalite RLT2-27-1A). When the predetermined high voltage charge is reached, the neon device breaks down discharging a pulse from the capacitor C8 through the primary T2' of a 1:1 pulse transformer T2 in the regulating circuit R which is the subject of the present invention.

The regulating circuit R within the dot-dash outline comprises a voltage dropping resistor R5 (22 kilohm) and a rectifier bridge (diodes D4,D5,D6,D7; General Instruments W005) in series with the high voltage transformer primary T1' across the 120 volt AC terminals A and C. Closing the manual On-Off switch S1 starts charge of a trigger capacitor C1 (0.22 microfarad) toward the 8 volt breakdown voltage of a silicon bilateral switch (SBS) Q1 (2N4991) which with the triac Q2 comprises a threshold controlled switch for starting charging of the storage capacitors. The charging of the trigger capacitor C1 is modified to a gradual rise characteristic by a regulator capacitor C2 (70 microfarad) connected between different arms of the bridge. The maximum possible voltage across the regulator capacitor C2 is limited to 30 volts by a zener diode D3 when line voltage is positive on terminal A and negative on terminal C. The charging circuit for the trigger capacitor C1 includes, in order, diodes D6, D5, capacitor C2 and diode D4. When the trigger capacitor C1 charges to the threshold voltage of the SBS-triac switch, the SBS breaks down triggering the triac and completing the circuit through the high voltage transformer primary T1'. The storage capacitors then begin to be charged toward the desired voltage predetermined by the setting of the potentiometer R2 for breakdown of the neon device NE1. As each half cycle of incoming voltage changes the polarity at line terminals A and C, capacitor C1 charges in alternating polarities but the voltage on capacitor C2 stays at the threshold level enabling C1 to receive all the energy from resistor R5 and therefor charge quickly and turn on the triac early each half cycle. The diode bridge D4-D7 maintains the threshold charge on capacitor C2 until this capacitor is discharged as explained below.

When the neon device D1 breaks down and discharges a pulse from the capacitor C8 the pulse transformer T2 transmits the pulse to the gate g of a silicon controlled rectifier (SCR) Q3 (G.E. C106Y) which is connected in shunt with respect to the regulator capacitor C2. The pulse closes the SCR and diverts the brige current therethrough rather than toward charging the trigger capacitor C1. The charge on the trigger capacitor C1 then drops below the threshold voltage of the SBS Q1 and the triac Q2 is shut off, momentarily interrupting high voltage charging of the storage capacitors C5, C6, C7. Bleeding of the storage capacitor charge through resistor R1 (20 kilohms) will quickly drop the charge voltage and the fraction thereof applied to the neon device NE1 so that its energy will not again be discharged to the pulse transformer T2 until the storage capacitors are recharged to the preselected voltage. Actually the time constants of the regulator circuit components are such that charging and bleeding cycles last only a few tenths of a second. This cycle interval is rapid enough to hold the storage capacitor charge to within a few (2 to 10) volts of the several hundred volts desired, and provide the desired precision of voltage charge on the storage capacitors and the desired intensity of flash lamp discharge.

The precision of charges is attributable to the closed control loop comprising the neon charge responsive sensor NE1, the controlled SRC valve Q3, the regulating capacitors C1, C2, the threshold controlled switch means Q1, Q2 and the transformer T1. These components constitute a primarily alternating current loop, the bridge D4-D7 providing alternate charging paths for the regulating capacitors C1, C2 while the triac Q2 has an alternating current supply.

FIG. 2 shows a modification of the regulating circuit R for the purpose of preventing lamp hang-up, that is, continued ionization after flash discharge with a low energy discharge which continues to bleed the storage capacitor preventing its recharge. The direct connection Z between points X and Y of the flash tube circuit is omitted and replaced by a low value resistance R9 (e.G. 0.005 ohms). Points X and Y are connected to a tertiary winding T2''' of the pulse transformer T2 whose secondary T2'' only is shown in FIG. 2. This modified circuit applies a pulse signal to the transformer simultaneous with flashing of the lamp FT, thereby discharging the regulating capacitor C2 and momentarily disabling the SBS-triac switch Q1, Q2 for an interval long enough to allow the flash lamp to deionize below hang-up level, as determined by the time constant of resistor R5 and capacitor C2 (approximately 0.2 seconds).

It should be understood that the present disclosure is for the purpose of illustration only and that this invention includes all modifications and equivalents falling within the scope of the appended claims. For example, the neon breakdown device NE1 and the SBS Q1 may be replaced with diacs.

I claim:

1. For maintaining a predetermined voltage on a storage capacitor charged from an alternating current power source, a regulating circuit comprising:
   alternating current input terminals,
   controlled switch means having current carrying electrodes connected to the alternating current terminals, and a control electrode responsive to a threshold voltage to start and stop charge of the storage capacitor from the alternating current input terminals,
   a voltage supply connected between the alternating current input terminals and the switch means control electrode,
   regulating means connected to the voltage supply for controlling application of the threhold voltage from the supply to the switch means,
   a controlled electron valve connected to and operative to control the regulating means, and
   means connected between the storage capacitor and valve responsive to charge of the storage capacitor to said predetermined voltage to operate the valve and stop the regulating means from applying the threshold voltage to the switch means,
   whereby said switch means, valve and charge responsive means complete a loop regulating the repeated starting and stopping of power supply to the storage capacitor, thereby to hold the charge on the storage capacitor at substantially constant voltage.

2. A circuit according to claim 1 wherein said regulating means comprises capacitative means, said valve controlling charging of the capacitative means from the voltage supply.

3. A circuit according to claim 1 wherein said alternating current input terminals are connected through said switch means to an alternating current transformer primary.

4. A circuit according to claim 1 in combination with an alternating current transformer primary in series with said switch means, and a secondary and rectifying means supplying charging current for the storage capacitor.

5. A circuit according to claim 4 wherein said responsive means is coupled between the secondary and said electron valve.

6. A circuit according to claim 5 wherein said responsive means, electron valve, regulating means, switch means and transformer comprise a closed loop.

7. A circuit according to claim 1 wherein said responsive means comprises a voltage breakdown device.

8. A circuit according to claim 1 wherein said voltage supply comprises a rectifier bridge having an alternating current input, said regulating means comprising a capacitor connected in parallel with said electron valve across the output of the bridge.

9. A circuit according to claim 1 wherein the responsive means is coupled to the electron valve by a pulse transformer.

10. A circuit according to claim 9 wherein the storage capacitor has a discharge circuit and said pulse transformer has a winding adapted to be connected to the discharge circuit and transmit a pulse signal to the electron valve upon discharge of the storage capacitor thereby momentarily disabling the switch means from restarting charge.

11. A circuit according to claim 10 in combination with a storage capacitor and a gas discharge device therefor.

12. A circuit according to claim 11 wherein said gas discharge device is a flash lamp.

13. A charge-discharge circuit comprising
   a gas discharge flash lamp (FT), a storage capacitor (C5) having a discharge circuit through the lamp, a power supply including an alternating current transformer (TI) having a primary (T1') and secondary (T1''), a rectifier (D1,D2) connected to the secondary, and a direct current charging connection between the rectifier and storage capacitor, a gas discharge breakdown device (NE1) and a series potentiometer (R2) in parallel with the storage capacitor, said device discharging at a voltage fraction of the charging direct current selected by the potentiometer, alternating current terminals (A,C), a controlled electronic switch (Q2) connecting the power transformer primary across the alternating current terminals, said controlled switch having a direct current threshold closing voltage and a breakdown silicon switch (Q1) for applying the threshold voltage thereto, closing of said switch starting charge of the storage capacitor, a rectifier bridge (D4-D7) between the alternating current terminals, a first regulating capacitance (C1) across the bridge and connected to the silicon switch for storing the threshold voltage, a second regulating capacitance (C2) across the bridge storing an enabling charge for the controlled switch (Q2), a controlled electronic valve (Q3) for discharging the second regulating capacitor, and a pulse transformer (T2) coupling the gas discharge breakdown device (NE1) to the electronic valve, breakdown of the device operating the valve to discharge the second regulating capacitance, disable the controlled switch (Q2), disconnect the power transformer primary (T1') and stop charging of the storage capacitors at a voltage selected by the potentiometer (R2), thereby to hold the charge on the storage capacitor at substantially constant voltage.

* * * * *